Figure 5:
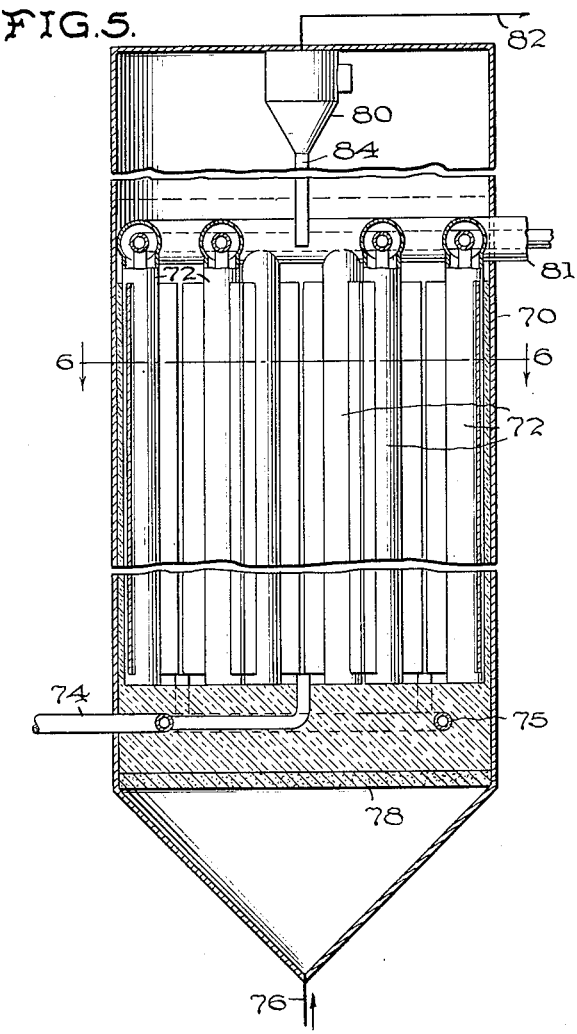

Aug. 28, 1956 J. V. WARD 2,760,842
FLUIDIZED FIXED BED PROCESS AND APPARATUS
Filed March 3, 1952 2 Sheets-Sheet 1
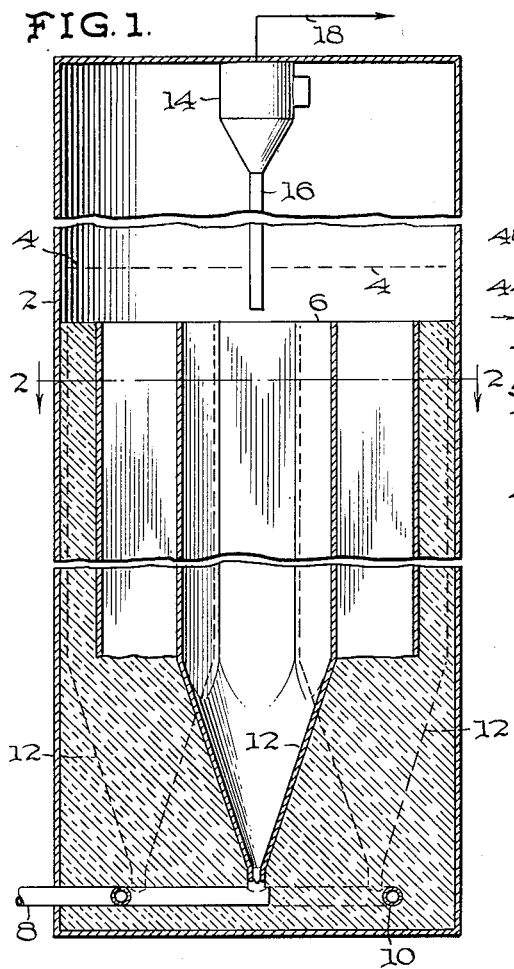
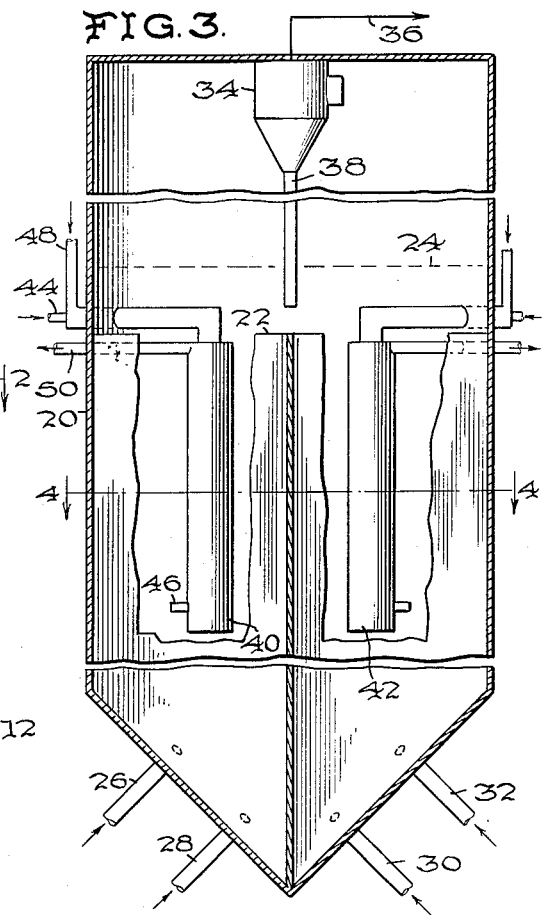
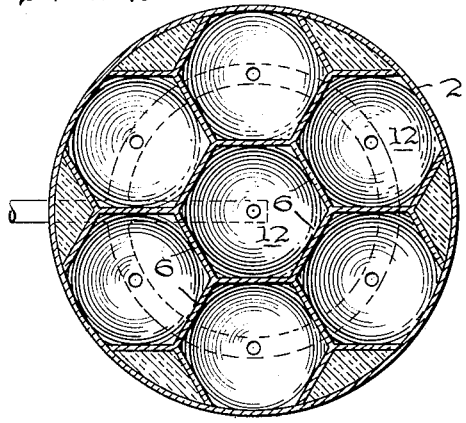
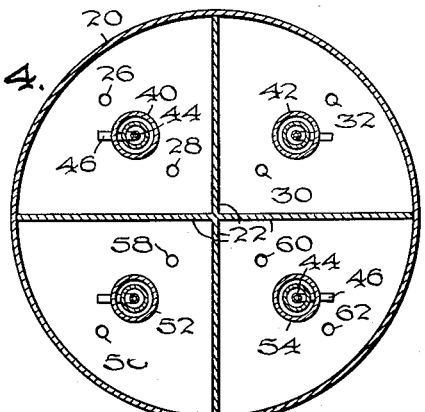
INVENTOR.
JOHN V. WARD
BY
HIS ATTORNEY Aug. 28, 1956 J. V. WARD 2,760,842
FLUIDIZED FIXED BED PROCESS AND APPARATUS
Filed March 3, 1952 2 Sheets-Sheet 2

INVENTOR.
JOHN V. WARD
BY
HIS ATTORNEY 2,760,842

FLUIDIZED FIXED BED PROCESS AND APPARATUS

John V. Ward, Plum Township, Allegheny County, Pa., assignor to Gulf Research & Development Company, Pittsburgh, Pa., a corporation of Delaware Application March 3, 1952, Serial No. 274,573

5 Claims. (Cl. 23—1)

This invention relates to an improved fluidized fixed bed catalytic process and apparatus for conversion of hydrocarbon oils, whereby improved contact of catalyst and reactant is obtained.

Fluidized catalytic processes are well known. Such processes involve the passage of a fluidizing vapor or gas, which may or may not be a reactant, upwardly through a bed of finely divided catalyst particles at a rate sufficient to expand the bed by the gas lift action of the fluidizing vapors on the catalyst particles. The expanded bed of catalyst acts in many respects as a liquid, e. g., as to flow characteristics, appearance, the exertion of a hydrostatic or "fluistatic" pressure, hence the name "fluidized" catalytic process.

The more prevalent of these fluidized catalytic processes are of the moving bed type, i. e., those in which there is continuous, cyclic flow of catalyst into and out of the reaction zone, usually to and from a regeneration zone.

In various instances, e. g., where the catalyst retains its activity over a long period of time, or where the transfer of catalyst between the reaction and regeneration zones is difficult, as when there is a relatively large pressure differential between the zones, a form of fluidized catalytic technique known as fluidized fixed bed operation may be preferred. In this type process substantially all of the catalyst is retained within the reaction zone during the entire on-stream period, there being no flow of catalyst into and out of the reactor during the processing phase.

The amount of catalyst circulation within the reactor for a given rate of feed introduction may be substantially less in fluidized fixed bed operations than in a fluidized moving bed operation. This will be evident from the fact that the circulation of catalyst particles is normally dependent entirely upon the action of the vapor or gas introduced into the bed and is not aided by flow of catalyst into and out of the reaction zone. For this reason, contact between reactant and catalyst in a fluidized fixed catalyst bed is often not as thorough as might be desired.

The difficulty of obtaining thorough reactant-catalyst contact in a fluidized fixed catalyst bed may be aggravated when low vapor velocities are employed. Low linear vapor velocities may be desirable for various reasons, e. g., to provide a long contact time, or for economic reasons. An example of the latter is found in reactions carried out at relatively high pressures. Where the pressure utilized is of significant magnitude, the amount of gas required to produce linear velocities of a degree comparable to those usually employed in conventional fluidized catalytic operations is large because of the compression factor. In hydrocracking, for example, or reforming in the presence of hydrogen, wherein hydrogen and a hydrocarbon oil feed are catalytically converted at pressures often above 500 p. s. i. g. or more, gas recycle rates necessary to produce the normally desired high linear vapor velocities would be enormous. The additional facilities necessary to accommodate these enormous volumes of gas, e. g., larger compressors, the expense of concentrating recycled hydrogen to the necessary purity in such large quantities, etc., would be expected to render this type of operation economically undesirable.

Thus, the rate of catalyst circulation is inherently less in fluidized fixed bed operations than in a fluidized moving bed operation. This rate of circulation may be still less when low linear vapor velocities are employed. In addition to these factors, the already low rate of catalyst circulation may be even less at the bottom of the reaction zone near the non-vertical reactor walls (where it is customary to introduce the feed), because the incoming gas stream may not be distributed well enough along these non-vertical surfaces. In other words, the incoming gas stream may not "fan out" sufficiently in the vicinity of the inlet to circulate thoroughly the catalyst particles in the relatively unswept zones near the non-vertical surfaces of the reactor bottom.

The factors described may combine in fluidized fixed bed catalytic operations carried out at low linear velocity to produce a relatively poor catalyst flow pattern within the reactor.

It is an object of this invention to provide a process in which catalyst-feed contact may be improved in a fluidized fixed catalyst bed, wherein a low linear vapor velocity is utilized. A further object is to increase the degree of conversion thereby. An additional object is to provide a process of the type described which will permit an improved catalyst flow pattern. It is a further object to provide a process of the type described in which random intermixing and interacting of products is avoided. A more particular object is to provide a process which will accomplish these results and which at the same time will permit close temperature control in the reaction zone. Another object is to provide a process of the type described in which the catalyst-feed contact is further improved by introducing a portion of the feed in a region of relatively higher catalyst turbulence. A more detailed object is to still further improve catalyst feed contact in a process of the type described by artificially increasing the local linear velocity and catalyst turbulence in the region where this portion of the feed is introduced. A still further object is to provide suitable apparatus for carrying out the process. Other objects will appear hereinafter.

These and other objects are accomplished by my invention which relates to a process in which a reactant is contacted with catalyst at conversion conditions of temperature and pressure in a reaction zone containing a dense phase, fluidized fixed bed of catalyst, and wherein the linear vapor velocity is relatively low, e. g., less than about 0.3 foot per second. The reaction zone mentioned above is subdivided at least through the greater portion of its depth into a plurality of parallel, substantially coextensive, vertical zones of reduced cross-section, each of said subdivided zones having a high length to effective diameter ratio. Reactant is introduced equally into each subdivided zone and contacted with the catalyst therein. Treated products are withdrawn from the reaction zone, but substantially all of the catalyst is retained therein during the on-stream period. Although passage of reactant through the subdivided reaction zone is continued for the duration of the on-stream period, the same catalyst particles are employed throughout the entire period without substantial intervening regeneration. In one form of the invention heat exchange is effected on the periphery of each of the subdivided zones. In one modification, wherein the feed comprises a gaseous or vaporous material and reactant containing difficultly volatilizable constituents, the invention includes the steps of introducing the gaseous or vaporous material at the bottom of the reaction zone and introducing the reactant containing difficultly volatilizable constituents higher in the reaction zone. One form of the last described modification provides for increasing the local linear vapor velocities in the region in which the liquid reactant is introduced. The invention also includes suitable apparatus for carrying out the process.

While certain preferred forms of the invention have been set forth in the accompanying description and the drawings, it is to be understood that they are by way of illustration only and are not to be considered as limiting.

Figure 6:
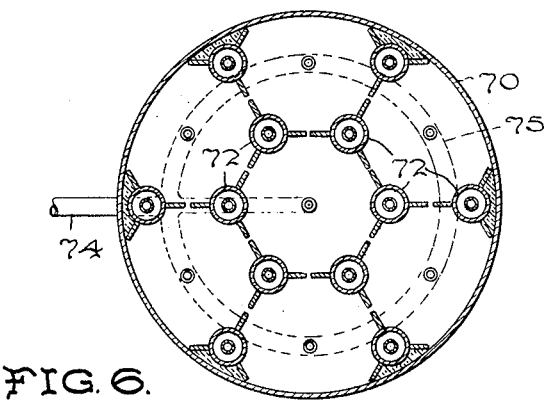
Figure 7:
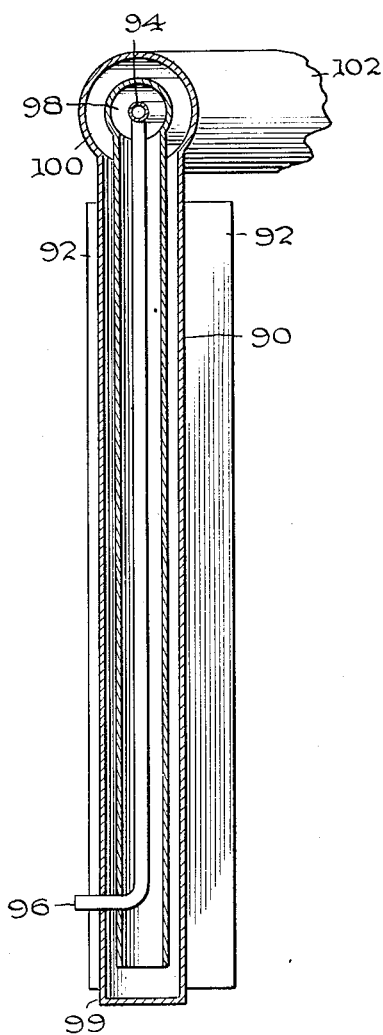

Referring briefly to the attached drawings, Figures 1, 3 and 5 represent partially sectional views of fluidized fixed bed reactors which embody the principles of my invention. Figures 2, 4 and 6 represent respectively sections of Figures 1, 3 and 5 along respective lines 2—2, 4—4, and 6—6. Figure 7 is a more detailed, although fragmentary, representation of a manifold and tubular heat exchange device which may be employed in the apparatus shown in Figures 3, 4, 5 and 6. The drawings are schematic only, certain details having been omitted. However, these details may be readily supplied by those skilled in the art. In the various figures, like numerals refer to the same elements.

As stated previously, difficulty may be experienced in obtaining good catalyst-feed contact in fluidized fixed catalyst beds, wherein low linear vapor velocities are utilized. This difficulty is believed to be at least in part due to the poor catalyst flow patterns which may be produced by the nonuniformity and poor rate of catalyst circulation. The catalyst flow pattern desired in a fluidized fixed bed operation is one in which there is a smooth flow of catalyst up the center and down the sides of the reactor.

When this type of flow exists, the feed first contacts catalyst near the reactor inlet, whereby the catalyst becomes more or less "loaded" with reactant. Under optimum conditions, this more or less "loaded" catalyst then moves away from the reactor inlet in its normal pattern of flow. Removal of catalyst containing adsorbed reactant from the inlet permits a new portion of catalyst, containing little or no reactant, to take its place and to adsorb the next portion of reactant introduced into the bed. During the normal travel cycle of the catalyst, reactant is reacted off the catalyst to form volatile products, which products are removed from the reactor. The type of catalyst flow described permits each particle of catalyst to contact reactant for about the same length of time and to absorb about the same quantity of reactant.

In a process where, for example, liquid droplets of oil are sprayed onto the catalyst and are converted to vaporized products and coke, a poor catalyst flow pattern may permit oil to build up on some of the particles and not to contact other particles at all.

Although operating conditions may, in such an instance, be adjusted to give a desired average conversion, the deviation of a substantial quantity of catalyst from the desired pattern and the non-uniform contact of feed and catalyst resulting therefrom may present serious problems. For example, all of the catalyst within the reactor may not be employed to the full extent of its effectiveness, the quality of the products may not consistently be in the optimum desired range because of non-uniform deactivation of catalyst, catalyst agglomeration may occur due to over-application of feed to some of the catalyst particles, with the result that the agglomerates drop out of the fluidized mass, and finally, the reaction may proceed in an unfavorable direction due to the plugging of the catalyst pores by the feed. The agglomerates mentioned above may further interfere with proper fluidization.

I have observed that the amount of vertical wall surface present in the reaction zone greatly affects tthe catalyst flow patterns, where low linear vapor velocities are utilized. When the vertical wall surface is relatively large as compared with the effective diameter of the reaction zone, the catalyst flow pattern is greatly improved. The relationship of the vertical wall surface to the effective diameter of the reaction zone may conveniently be expressed as the $L/D$ ratio, where $L$=the vertical height of the zone and $D$=the effective diameter, or the diameter of a circle having an area the same as the horizontal area of the zone.

A high $L/D$ ratio may be produced in the reaction zone of a fluidized catalytic reactor of commercial form and size by vertically subdividing the reaction zone into a plurality of relatively long, narrow, substantially coextensive, parallel paths. A plurality of intersecting or substantially intersecting, vertical partitioning walls may be used for this purpose.

The partitioning or subdividing of the reaction zone to increase the $L/D$ ratio in a fluidized fixed bed catalytic conversion utilizing a low linear velocity is the essence of the present invention in its simplest form. Advantageously, the subdividing partitions may comprise tubular finned heat exchangers of conventional type, the fins of adjacent heat exchangers being arranged to provide the partitioning effect. These heat exchangers may be employed either to add or remove heat from the reaction zone. Also, by virtue of their uniformly dispersed arrangement, close control of reaction temperature throughout the reaction zone is permitted.

In a more complex modification, wherein a reactant containing difficultly volatilizable constituents, such as a hydrocarbon oil, and a gaseous material are contacted in a fluidized fixed catalytic bed at low linear vapor velocities, an improvement is effected by introducing the gaseous material near the bottom of the reaction zone, while the liquid-containing reactant is introduced higher in the catalyst bed, where the rate of catalyst circulation is greater. When the liquid-containing reactant is introduced in a region of greater catalyst motion, catalyst-liquid contact is improved, since a given quantity of liquid is spread over a relatively larger amount of catalyst. While improved catalyst-feed contact is always desirable, it is particularly important where a portion of the charge remains temporarily in the liquid phase at reaction conditions. Such a condition may exist, for example, in the treatment of hydrocarbon oils, where a heavy, difficultly volatilizable feed of low API gravity is employed and/or where pressures above the critical pressure of a portion of the feed are employed. By difficultly volatilizable feed is meant one in which a portion cannot be volatilized at reaction temperature without decomposition.

In one form of the last described modification the gaseous reactant is introduced at the base of the reactor, while the liquid-containing reactant, preferably in admixture with a gaseous diluent, is passed through finned heat exchangers positioned within the reaction zone and is subsequently introduced into a region of the reaction zone substantially above the gas inlet. The finned heat exchangers through which the liquid inlet line passes may be those described above which effect the partitioning of the reactor, or alternatively, they may be separately positioned within each of the subdivided zones in the reactor. By passing the oil feed interiorly of the heat exchanger, preheating of the feed without overheating is accomplished. Furthermore, when separate combination heat exchange and feed injection devices are employed in each of the subdivided vertical zones, the catalyst circulation in the region near the oil inlet is improved by the very presence of these devices. Since each heat exchanger occupies a portion of the space in the subdivided vertical zone, the path of flow of the vapors and catalyst is somewhat constructed. The constricting effect increases the local linear velocities and catalyst turbulence in the region near the inlet. As pointed out above, this results in spreading the feed over a relatively larger amount of catalyst immediately upon introduction into the reaction zone.

The invention may be more easily understood with reference to certain specific modifications shown in the drawings. Referring now to Figure 1 in detail, numeral 2 refers to the reactor shell, numeral 4 illustrates the upper level of the dense phase, fluidized fixed catalyst bed. The subdividing partitioning walls referred to previously are shown by the structure identified by numeral 6. Numerals 8 and 10 refer respectively to the feed inlet line and the distributor. Numerals 12 refer to a plurality of substantially cone-shaped members through which the feed is introduced into the subdivided reaction zones bounded by partitioning elements 6. Preferably the cones are faired at the upper ends to conform with the peripheries of the sections of the reaction zone. Numeral 14 denotes a cyclone separator positioned in the upper portion of reactor 2. This separator in conjunction with certain normally closed valves in the catalyst replacement means (not shown) constitute means for retaining substantially all of the catalyst within the reactor throughout the on-stream period, and is that means which enables the carrying out of a fluidized fixed bed process.

For convenience, the operation of the various structures shown in the drawings will be described in connection with a preferred reaction, namely, hydrocracking or destructive hydrogenation of a hydrocarbon oil. In operation, a feed stream comprising hydrogen and hydrocarbon oil, preheated and compressed to the desired temperature and pressure by means not shown, is introduced into the reactor and divided into substantially equal portions by inlet line 8 and distributor 10. From distributor 10 the hydrogen and oil pass into conical members 12 and thence into the lower portions of the dense phase, fluidized catalyst. The hydrogen and oil pass upwardly through the reaction zone which is subdivided into a plurality of parallel, vertical zones of reduced cross-section, each zone containing a fluidized fixed bed of catalyst and having a high $L/D$ ratio.

Brief reference to Figure 2 will indicate the disposition of the partitioning members 6 within the reactor.

Within each of the long, narrow zones improved catalyst-feed contact and more uniform circulation of catalyst from top to bottom of the reaction zones are produced. An additional advantage of the partitions referred to is that they prevent random intermixing and interacting of the products formed in the various regions of the reactor. The quality of the products is thereby improved.

The treated reactants pass out of these parallel vertical zones, out of the dense phase catalyst bed 4 and into cyclone separator 14. The bulk of the entrained catalyst is removed from the vapors and returned to the main body of catalyst by way of standpipe 16. Product vapors, substantially free of catalyst, are withdrawn through line 18 to conventional product recovery equipment (not shown) for fractionation and, if desired, further refining. Pressure is maintained in the reactor by use of a suitable pressure control valve (not shown) placed down-stream from the reactor.

It may be mentioned that the small, partial compartments positioned around the periphery of the reaction vessel, are preferably not utilized. These partial compartments may be filled with insulating material or otherwise closed as indicated in the drawing. This is preferred in order to produce the optimum $L/D$ ratio throughout the reaction zone.

In the apparatus shown in Figure 3 the reaction zone is divided into four compartments having a high length to diameter ratio by radially disposed partitioning walls 22. Reference to Figure 4 will indicate more clearly the disposition of these dividing members 22. In this modification the partitioning walls are extended to the bottom of the reactor 20 and feed is introduced separately into each vertical compartment. In Figure 3 the feed lines are indicated by numerals 26, 28, 30 and 32, while in Figure 4 additional lines 56, 58, 60 and 62 are shown. In this modification the feed, comprising hydrogen and oil, enters the dense phase, fluidized fixed bed at low linear vapor velocity through the previously described inlets. As in the previous modification the hydrogen and oil pass upwardly through the elongated subdivided zones bounded by partitioning walls 22 and reactor shell 20 with the production of similar results. Converted products pass out of the dense phase catalyst bed 24 through cyclone separator into outlet line 35. Catalyst removed from the product vapors within cyclone separator 34 is returned to the main body of catalyst through standpipe 38.

Alternatively, the operation of the reactor shown in Figure 3 as well as that of the other reactors illustrated in the various drawings may be modified by employing combined heat exchange and oil injection structures of the type designated by numerals 40 and 42. These elements are positioned substantially centrally of each of the elongated compartments in such a manner that the hydrocarbon oil inlet conduit passing therethrough will discharge adjacent the heat exchanger in a region relatively high in the catalyst bed. Reference to Figure 4 will indicate more clearly the positioning of elements 40 and 42 and similar elements 52 and 54.

When these exchangers are employed, hydrogen alone is introduced through the inlet lines at the base of the reactor, while preheated hydrocarbon oil, preferably in admixture with gaseous hydrogen, is introduced into the reactor by way of line 44. This portion of the feed passes through heat exchanger 40 and is discharged into the catalyst bed at outlet 46. A heat exchanging medium, such as water or steam, may be circulated into line 48 and out through line 50 or in the reverse direction. Elements 42, 52 and 54 operate similarly. The combination heat exchange-oil injection structures shown effect controlled heating of the oil within the inlet conduit to prevent overheating and coking while at the same time providing a convenient means for effecting heat exchange within the subdivided reaction zones.

While the hydrogen-hydrocarbon oil feed may be introduced separately into each of the heat exchangers, as illustrated in Figure 3, it may be more preferable to provide a manifold or header device within the reactor and connecting to all of the heat exchangers. Such structure is particularly desirable, where a relatively large number of heat exchangers are employed.

Since outlet 46 is placed relatively high in the catalyst bed and adjacent the heat exchanger, the hydrocarbon oil is introduced in a zone of greater catalyst turbulence than that present in the lower portion of the reactor. Furthermore, by virtue of the fact that these heat exchangers occupy space, they produce a constricting effect within each of the elongated, subdivided zones thereby increasing the local linear velocities. In this manner, the rate of catalyst circulation in the zone of oil introduction is further improved over the average degree of turbulence within the subdivided zones. Improved distribution of the oil in the bed of catalyst is the net result of the improved catalyst circulation.

Referring now to Figure 5 a further modification of the invention is shown. In this modification the recation zone is subdivided into a plurality of parallel zones of high $L/D$ ratio by means of tubular, finned heat exchangers 72. These heat exchangers are of conventional reverse flow type employing an outer tube and a smaller, centrally positioned, concentric tube of shorter length. For simplicity of illustration the manifolding means 81 employed for the heat exchangers of Figure 5 has been shown partly broken away. Reference to Figure 6 indicates that adjacent fins of adjacent heat exchangers are arranged to lie in substantially the same plane. By virtue of this expedient the fins of the heat exchangers provide the partitioning effect desired. In the modification shown, wherein heat exchangers having three fins are employed, the reaction zone is divided into a plurality of elongated, parallel zones of substantially hexagonal shape, whereby an overall "honeycomb" pattern is produced. Adjacent fins may or may not be disposed contiguously, as desired. In Figures 5 and 6 a small space is left between the adjacent fins. The use of heat exchangers as the partitioning means additionally permits very close temperature control during the reaction.

Again referring to Figure 5, feed which in this instance may comprise preheated hydrogen is introduced through inlet line 78 positioned at the base of the reactor. From this line the hydrogen passes through porous distributor plate 78, or other element having a similar function, into the compartments bounded by heat exchangers 72 and reactor shell 70. The porous plate operates to distribute the hydrogen equally into all of the sections of the reaction zone. The hydrocarbon oil enters the system through line 74 from which it passes into a distributor 75 having individual outlets projecting upwardly to or into the separate portions of the reaction zone bounded by the fins of heat exchangers 72.

As in the modifications described above, converted products pass out of the dense phase catalyst bed 79 and into cyclone separator 80. Catalyst separated from the product vapors is returned to the main body of catalyst through standpipe 84, while treated products are withdrawn through line 82.

The operation of the device shown in Figure 5 may be further modified by employing a structure of the type illustrated in Figure 7 in place of heat exchangers 72. The heat exchanger of Figure 7 is also of the type satisfactory for use as elements 40, 42, 52 and 54 in reactor 20 of Figure 3. The heat exchanger of Figure 7 differs over those illustrated in Figure 5 in that a feed conduit 94 passes interiorly thereof. In Figure 7, numeral 90 refers to the over-all heat exchanger structure and numeral 92 refers to the fins thereof. Numerals 98 and 100 refer respectively to the introductory and withdrawal means for the circulating heat exchange medium. Numeral 96 denotes the outlet of feed line 94. Numeral 102 designates a portion of a suggested manifolding device.

When heat exchanger tubes of the type illustrated in Figure 7 are employed as the partitioning means in the reactor of Figure 5, lines 74 and distributor 75 are omitted. In this instance, a hydrocarbon oil preferably in admixture with hydrogen is passed interiorly of the heat exchange device through line 94 from which it is discharged into the fluidized fixed catalyst bed by way of outlet 96. Sufficient heat exchangers of the type shown are provided in order that each subdivided portion of the reaction zone may have at least one oil inlet. A heat exchange medium such as, for example, water or steam, is passed through line 98 which jackets oil inlet line 94. Upon reaching the end of line 98 the heat exchange medium passes upwardly through line 99 to outlet 100. Alternatively the heat exchange medium may flow in the reverse direction. Use of the device of Figure 7 permits close heat control within the reaction zone and provides controlled preheating of the feed by the heat of the reaction zone prior to contact of the feed with catalyst.

As has been indicated the most fundamental improvement brought about by the invention is the improved catalyst flow pattern produced in a fluidized fixed bed catalytic reactor, wherein low gas velocities are employed in the reaction zone. This improvement is effected by subdivision of the reaction zone as indicated. The important effect produced by this subdivision is due to the increase in length to effective diameter or $L/D$ ratio existing within the zone in which catalytic conversion is effected. The $L/D$ ratio normally present in the reaction zone of a fluidized catalytic reactor of commercial size varies between about 1:1 and 3:1. Substantially higher ratios are contemplated in the present invention e. g., ratios ranging from about 6:1 to 15:1.

The number and arrangement of partitions are advantageously chosen to provide an area in each subdivided reaction zone of between about one-half and about 20 square feet in combination with an $L/D$ ratio within the range described. Preferably, the area of each subdivided reaction zone is from about 0.8 to about 7 square feet, with an $L/D$ ratio from about 6:1 to about 15:1.

The cross-sectional shape of the subdivided reaction zones may be varied somewhat but is preferably as near to circular as practicable. In other words, the preferred cross-sectional shape is one in which the effective diameter corresponds closely to the actual diameter.

The catalytic conversion of carbonizable reactants is accompanied by the deposition of contaminants, principally of a carbonaceous and/or hydrocarbonaceous nature, on the catalyst. These contaminants tend to reduce the activity of the catalyst. Accordingly, at periodic intervals catalyst either must be regenerated or replaced. Where regeneration is desired, regeneration gases, e. g., oxidizing gases, may be passed through the catalyst bed within the reactor. In the structures shown in the drawings regeneration may be accomplished by introducing the regenerating or reactivating gas into the catalyst bed by way of the feed inlets. Since the details of catalyst regeneration form no part of the invention, and since they are well known in the art, they need not be discussed in detail. However, it should be noted that temperature control, a serious problem during the exothermic reactivation treatment, is aided greatly by the presence of the heat exchanging devices in the reactor.

Where the partitioning walls extend entirely to the bottom of the reactor, it is of course necessary to introduce feed separately into each subdivided zone. Where the partitioning walls do not extend completely to the bottom of the catalyst bed, it is advantageous to provide means for subdividing and introducing feed equally into each long, narrow zone. In Figure 5 for example distributor 75 and porous plate 78 perform this function. If these or equivalent elements are omitted and the feed is introduced over a relatively small area beneath the partitioning walls the effect of the partitioning walls may be lost. In such instances, the upward flow of feed may concentrate itself in one or a few of the long narrow zones.

The partitioning walls discussed above should extend all the way to or substantially to the bottom of the catalyst bed, but may or may not extend to or above the top of the catalyst bed. In all instances, however, the partitions should extend through the greatest portion of the bed, and opportunity should be provided for migration of catalyst to different regions of the reactor, so that the depth of the catalyst bed remains substantialy equal across the reactor. Thus, when the individual small reaction zones are in contact, as when partitioning heat exchangers having non-contiguous fins are employed, the partitions may extend to or above the top of the bed. When the individual zones are sealed off from each other as in Figure 3, the partitions should stop short of the top of the catalyst bed. The partitions should extend to or substantially to the bottom of the catalyst bed to insure equal introduction of feed into each chamber.

The invention is applicable to any catalytic conversion carried out in a fluidized fixed catalyst bed. It is particularly applicable to catalytic conversions of hydrocarbon oils which are carried out in the presence of a separate, normally gaseous or vaporous diluent or reactant. Examples of such processes are hydrocracking or destructive hydrogenation and reforming in the presence of hydrogen. The invention is also useful for hydrocarbon synthesis processes.

The low linear vapor velocities referred to are those which produce a degree of turbulence or catalyst circulation substantially less than that normally encountered in fluidized catalytic operation. These particular velocities may vary according to the particular size and density of the catalyst employed. In general, the low linear vapor velocities for which any invention is most useful are those superficial velocities of about 0.3 foot per second or less and particularly those between about 0.05 and 0.2 foot per second.

These low linear velocities are most often employed in catalytic conversions carried out at substantially elevated pressure, e. g., several hundred pounds or much more, for the reasons mentioned above. Accordingly, the invention is particularly valuable in connection with such operations.

The catalyst employed may be supported or unsupported and are those normally employed for the particular reaction involved. The particle sizes contemplated are those usually made use of in fluidized catalytic operations, i. e., between about 50 and 400 mesh.

Charge stocks employed may comprise any feed normally employed in the particular reaction being carried out. Since certain modifications of the invention enable the charge to be introduced in regions of greater catalyst circulation, the invention has particular utility in processes involving a difficultly volatilizable hydrocarbon oil feed, wherein a portion of the feed is in the liquid phase at reaction conditions. This is as discussed above, because the liquid portion of the charge may wet the catalyst particles and cause clumping or agglomeration when contacted with too small a quantity of catalyst. Examples of difficultly volatilizable feeds are topped or reduced crude or total crudes containing heavy, residual components.

Conversion conditions not otherwise discussed, e. g., temperature, etc., contemplated in the invention are those conventionally employed in the art for the particular reaction to be carried out. These form no part of the invention and need not be discussed in detail.

One advantage of the invention is that improved catalyst-feed contact is produced, thus providing a higher degree of conversion. An additional advantage of the invention resides in avoiding catalyst agglomeration and other difficulties which may be encountered when using difficultly volatilizable hydrocarbon oil feeds. Another advantage produced by the invention is that random intermixing and interacting of products is avoided. Another advantage is that a convenient means of effecting heat exchange within the reaction zone and also preheating feed without overheating is provided while at the same time producing the advantages pointed out above.

What I claim as my invention is:

1. A catalytic conversion process comprising contacting a non-carbonizable gaseous reactant and a second reactant which contains carbonizable, difficultly vaporizable constituents that remain at least temporarily in the liquid phase at conversion conditions, with catalyts at conditions of temperature and pressure that are adapted to promote inter-reaction of said reactants, said contacting being carried out in a reaction zone containing a dense-phase fluidized fixed bed of catalyst, wherein the linear vapor velocity is not more than about 0.3 feet per second, said reaction zone being subdivided at least through the greater portion of its depth into a plurality of adjacent, parallel, substantially coextensive, vertical zones, each of which subdivided zones has a length to effective diameter ratio of from about 6:1 to about 15:1 and a cross-sectional area between about 0.5 and about 20 square feet, in each of which subdivided zones the catalyst particles circulate cyclically between the upper and lower extremities of the dense-phase catalyst bed, said contacting being effected by introducing the non-carbonizable gaseous reactant in equal amounts into the bottom of each of the subdivided zones where catalyst circulation is relatively low, and by passing said second reactant in equal amounts downwardly in elongated confined paths within the dense-phase catalyst in the subdivided zones while maintaining said second reactant out of contact with the catalyst, thereby forming constricted regions beside said confined paths in said subdivided zones, in which constricted regions the catalyst circulation and vapor velocity are greater than elsewhere in the subdivided zones, and passing said second reactant from said elongated confined paths into said constricted regions at substantially elevated levels in said subdivided zones, the initial contact of said non-carbonizable gaseous reactant, catalyst and said second reactant being effected in said constricted regions, effecting a reaction between said reactants, withdrawing converted products and continuing to contact additional quantities of reactants with the same catalyst particles without substantial intervening regeneration of the latter until the end of a processing period.

2. The process of claim 1 in which said second reactant is preheated before contact with catalyst and during passage through said elongated confined paths without substantial carbonization thereof by indirect heat exchange with a circulating heat exchange medium that is in turn heated by indirect heat exchange with the materials in the zones surrounding said elongated confined paths.

3. Catalytic apparatus comprising a reaction vessel adapted to contain a dense-phase, fluidized fixed bed of catalyst in the lower portion thereof, vertical partitioning means positioned within the reaction vessel and adapted to subdivide the reaction vessel through at least the greater portion of the depth of the catalyst bed into a plurality of adjacent, parallel, substantially coextensive compartments, each of said compartments having a length to effective diameter ratio of between about 6:1 and about 15:1 and a cross-sectional area of between about 0.5 and about 20 square feet, means for introducing charge stock at low linear velocity equally into said compartments, said means for introducing charge stock comprising means for introducing gaseous materials at the bottom of each of said compartments, and reactant conduits connected at their upper ends to a source of reactant, said reactant conduits being positioned within said reaction vessel and extending downwardly into the dense-phase bed of catalyst, each reactant conduit being adapted to discharge reactant into a region laterally adjacent itself and substantially above the bottoms of said compartments, a first jacket member coaxial with, spaced apart from and surrounding each of said reactant conduits, said first jacket member communicating at one end with the interior of a second jacket member, coaxial with, spaced apart from and surrounding said first jacket member, said first and said second jacket members being adapted to conduct a flow of a heat exchange medium, means for withdrawing converted products from the reaction vessel and means for retaining substantially all of the catalyst within the reaction vessel during a processing period.

4. Catalytic apparatus comprising a reaction vessel adapted to contain a dense-phase, fluidized fixed bed of catalyst in the lower portion thereof, vertical partitioning means positioned within the reaction vessel and adapted to subdivide the reaction vessel through at least the greater portion of the depth of the catalyst bed into a plurality of adjacent, parallel, substantially coextensive compartments, each of said compartments having a length to effective diameter ratio of between about 6:1 and about 15:1 and a cross-sectional area of between about 0.5 and about 20 square feet, means for introducing charge stock at low linear velocity equally into said compartments, said means for introducing charge stock comprising means for introducing gaseous materials at the bottom of each of said compartments, and a tubular heat exchange device positioned substantially centrally within each of said compartments and in only the upper portion thereof, said tubular heat exchange device comprising a pair of outer and inner, coaxial, spaced-apart jacket members adapted to communicate with one another and to conduct a flow of a heat exchange medium, said inner jacket member being coaxial with, spaced apart from and surrounding a reactant conduit positioned interiorly of each heat exchange device, said reactant conduit being adapted to discharge reactant into the surrounding compartment in a region beside said tubular heat exchange device, means for withdrawing converted products from the reaction vessel and means for retaining substantially all of the catalyst within the reaction vessel during a processing period.

5. A catalytic apparatus comprising a reaction vessel adapted to contain a dense-phase fluidized fixed bed of catalyst in the lower portion thereof, vertical partitioning means positioned within the reaction vessel, comprising elongated finned heat exchangers arranged so that adjacent heat exchangers lie in the same plane, said vertical partitioning means being adapted to subdivide the reaction vessel through at least the greater portion of the depth of the catalyst bed into a plurality of adjacent, parallel, substantially coextensive compartments, each of said compartments having a length to effective diameter ratio of between about 6:1 and about 15:1 and a cross-sectional area of between about 0.5 and about 20 square feet, means for introducing charge stock at low linear velocity equally into said compartments, said means for introducing charge stock comprising means for introducing gaseous materials at the bottom of each of said compartments, and reactant conduits connected at their upper ends to a source of reactant, said reactant conduits being positioned within said reaction vessel and extending downwardly into the dense-phase bed of catalyst, each reactant conduit being adapted to discharge reactant into a region laterally adjacent itself and substantially above the bottoms of said compartments, a first jacket member coaxial with, spaced apart from and surrounding each of said reactant conduits, said first jacket member communicating at one end with the interior of a second jacket member, coaxial with, spaced apart from and surrounding said first jacket member, said first and said second jacket members being adapted to conduct a flow of a heat exchange medium, means for withdrawing converted products from the reaction vessel and means for retaining substantially all of the catalyst within the reaction vessel during a processing period.

References Cited in the file of this patent

UNITED STATES PATENTS

| | | |
|---|---|---|
| 2,185,928 | Simpson et al. | Jan. 2, 1940 |
| 2,283,208 | Houdry et al. | May 19, 1942 |
| 2,310,962 | Lassiat | Feb. 16, 1943 |
| 2,359,310 | Hemminger | Oct. 3, 1944 |
| 2,378,342 | Voorhees et al. | June 12, 1945 |
| 2,419,245 | Arveson | Apr. 22, 1947 |
| 2,420,145 | McAfee | May 6, 1947 |
| 2,464,812 | Johnson | Mar. 22, 1949 |
| 2,500,516 | Carpenter | Mar. 14, 1950 |
| 2,546,570 | Vance | Mar. 27, 1951 |
| 2,584,391 | Leffer | Feb. 2, 1952 |
| 2,617,708 | Peery | Nov. 11, 1952 |